United States Patent
Miller et al.

(10) Patent No.: US 10,655,716 B2
(45) Date of Patent: May 19, 2020

(54) SLEW DRIVE WITH INTEGRATED REDUCER ASSEMBLY

(71) Applicant: Kinematics, LLC, Huntington Beach, CA (US)

(72) Inventors: Kenneth D. Miller, Statesville, NC (US); Adam P. Plesniak, Huntington Beach, CA (US); Kyle Zech, Phoenix, AZ (US); Mark Henderson, La Verne, CA (US)

(73) Assignee: KINEMATICS, LLC, Huntington Beach, CA (US)

(*) Notice: Subject to any disclaimer, the term of this patent is extended or adjusted under 35 U.S.C. 154(b) by 75 days.

(21) Appl. No.: 16/110,218

(22) Filed: Aug. 23, 2018

(65) Prior Publication Data
US 2019/0101198 A1 Apr. 4, 2019

Related U.S. Application Data

(60) Provisional application No. 62/565,385, filed on Sep. 29, 2017.

(51) Int. Cl.
| | |
|---|---|
| *F16H 1/46* | (2006.01) |
| *F16H 37/04* | (2006.01) |
| *F16H 19/00* | (2006.01) |
| *F24S 30/425* | (2018.01) |
| *E02F 9/12* | (2006.01) |
| *F16H 57/02* | (2012.01) |

(Continued)

(52) U.S. Cl.
CPC ............ *F16H 37/041* (2013.01); *E02F 9/12* (2013.01); *F16C 17/10* (2013.01); *F16H 19/001* (2013.01); *F16H 19/02* (2013.01); *F16H 55/22* (2013.01); *F16H 57/01* (2013.01); *F16H 57/02* (2013.01); *F24S 30/425* (2018.05); *G01D 5/14* (2013.01); *F16H 1/16* (2013.01); *F16H 1/46* (2013.01); *F16H 57/0025* (2013.01); *F16H 57/021* (2013.01); *F16H 57/039* (2013.01); *F16H 2055/065* (2013.01); *F16H 2057/012* (2013.01); *F16H 2057/0213* (2013.01); *F16H 2057/02078* (2013.01); *G01D 5/142* (2013.01)

(58) Field of Classification Search
CPC .. F16H 57/039; F16H 57/0025; F16H 57/021; F16H 57/01; F16H 57/02; F16H 2055/065; F16H 2057/012; F16H 2057/02078; F16H 2057/0213; F16H 19/02; F16H 19/04; F16H 55/22; G01D 5/142; G01D 5/14; F16C 17/10; F16C 17/16
USPC ............ 74/29, 30, 89.14, 424, 425; 475/343
See application file for complete search history.

(56) References Cited

U.S. PATENT DOCUMENTS

| | | | | |
|---|---|---|---|---|
| 4,133,344 A | * | 1/1979 | Hunter | ................ A01G 25/092 239/728 |
| 4,777,847 A | * | 10/1988 | Pickles | .................... F16H 1/30 475/149 |

(Continued)

*Primary Examiner* — Leslie A Nicholson, III
(74) *Attorney, Agent, or Firm* — Ahmadshahi & Associates (57) ABSTRACT

A slew drive comprises a worm gear which is integrated with a reducer assembly. One end of the worm gear operates as a carrier which engages a plurality of planetary gears which are part of the reducer assembly. The carrier may be a separate component that is coupled with the worm gear. Alternatively, one end of the worm gear can be machined to operate as the carrier. The carrier engages a plurality of planetary gears via a plurality of holes.

14 Claims, 5 Drawing Sheets

(51) Int. Cl.
*F16H 57/01* (2012.01)
*F16H 19/02* (2006.01)
*F16H 55/22* (2006.01)
*G01D 5/14* (2006.01)
*F16C 17/10* (2006.01)
F16H 1/16 (2006.01)
F16H 57/021 (2012.01)
F16H 57/00 (2012.01)
F16H 55/06 (2006.01)
F16H 57/039 (2012.01)

(56) References Cited

U.S. PATENT DOCUMENTS

| | | | | |
|---|---|---|---|---|
| 5,168,295 | A * | 12/1992 | Yoshihara | G03B 17/425 396/406 |
| 5,671,457 | A * | 9/1997 | Yokoyama | G03B 17/425 396/411 |
| 6,377,754 | B1 * | 4/2002 | Sugita | G03B 3/10 396/132 |
| 8,905,895 | B2 * | 12/2014 | Scalf | H02K 11/24 475/343 |
| 9,309,806 | B2 * | 4/2016 | Kuroda | F02B 37/186 |
| 2016/0091051 | A1 * | 3/2016 | Morgan | F16C 19/16 74/425 |
| 2018/0186398 | A1 * | 7/2018 | Shimizu | B62D 5/04 |

* cited by examiner

FIG. 5

SLEW DRIVE WITH INTEGRATED REDUCER ASSEMBLY

CROSS REFERENCE TO RELATED APPLICATIONS

The present patent application is a formalization of a previously filed co-pending provisional patent application entitled "Slew Drive with Integrated Reducer Assembly," filed on 2017 Sep. 29, as U.S. patent application Ser. No. 62/565,385 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to slew drives which include a worm wheel and a worm gear that is integrated with a reducer assembly so as to eliminate certain components and reduce the overall length of the system. In particular, one end of the worm gear operates as a carrier which engages a plurality of planetary gears that are part of the reducer assembly. The carrier may be a separate component that is coupled with the worm gear. Alternatively, one end of the worm gear can be machined to operate as the carrier. The carrier engages a plurality of planetary gears via a plurality of holes.

BACKGROUND

A slew drive is in essence a gearbox that is capable of withstanding axial and radial loads while being able to transmit torque to drive an external unit. There are many applications where a slew drive is utilized such, as solar trackers, wind turbines, lifts, and cranes, to name a few. They are generally constructed from a threaded shaft, commonly referred to as the worm gear and a geared wheel, commonly referred to as the worm wheel. The axes of rotation of the worm gear and worm wheel are, in general, perpendicular, although they can be at other orientations. A slew drive further includes bearings, seals, housings, a motor, and alternatively, a reducer assembly. The reducer assembly may comprise a series of planetary gear trains including planetary gears, sun gears, and carriers. The reducer assembly's input is coupled with the motor which operates at high speed and low torque. The reducer assembly's output is coupled with the worm gear which operates at a substantially lower speed but substantially higher torque.

A conventional slew drive generally includes a worm wheel, a worm gear, a reducer assembly, and a motor. The motor turns the reducer assembly and the reducer assembly rotates the worm gear which, in turn, rotates the worm wheel. The reducer assembly includes a coupling mechanism utilized to couple the reducer assembly to the worm gear. This coupling mechanism includes a carrier and a splined shaft. The carrier engages the splined shaft via its centrally located female splined bore. The carrier rotates the splined shaft which, in turn, rotates the worm gear via its own centrally located female splined bore.

In one configuration, the carrier and the splined shaft are fabricated as a one-piece mechanism which is utilized to couple the reducer assembly to the worm gear. This type of construction requires one or more seals in order to prevent the grease or oil, commonly used to lubricate the reducer assembly, from entering into the worm gear/worm wheel assembly.

An objective of the present design is to integrate the reducer assembly into the worm gear. Specifically, the slew drive includes a worm gear which further operates as a carrier, eliminating the need for a splined shaft and the seals, and shortening the overall length of the system.

SUMMARY

In one aspect, a slew drive is disclosed wherein the slew drive comprises a housing, a worm wheel comprising worm-wheel teeth, wherein the worm wheel is rotatably secured within the housing and operative to rotate around a first axis, a worm gear comprising a first distal end, a second distal end, and a central segment disposed between the first distal end and the second distal end, wherein the central segment comprises a worm-gear thread, wherein the worm gear is rotatably secured within the housing and operative to rotate around a second axis, wherein the first distal end comprises a plurality of holes whose axes are coaxial with the second axis, and a reducer assembly comprising a plurality of reducer subassemblies, wherein one of the plurality of reducer subassemblies is in direct contact with the worm gear, via the plurality of holes.

Preferably, each of the plurality of reducer subassemblies comprises at least one of a carrier, a sun gear, and three planetary gears.

Preferably, the one of the plurality of reducer subassemblies comprises three planetary gears in direct contact with the worm gear, via three of the plurality of holes.

Preferably, the first axis is perpendicular to the second axis.

Preferably, the slew drive further comprises a motor coupled with the reducer assembly and operative to rotate the reducer assembly around the second axis. Preferably, the motor is one of a hydraulic motor, an electric motor, and a pneumatic motor.

Preferably, a cross section of the plurality of holes comprise one of a circular cross section, a square cross section, and a hexagonal cross section.

Preferably, the plurality of holes are splined.

In another aspect, a worm gear in combination with a slew drive is disclosed wherein the slew drive comprises a housing, a worm wheel, and a reducer assembly, wherein the worm wheel comprises worm-wheel teeth and wherein the reducer assembly comprises a plurality of reducer subassemblies, wherein the worm gear comprises a first distal end, a second distal end, and a central segment disposed between the first distal end and the second distal end, wherein the central segment comprises a worm-gear thread, wherein the first distal end comprises a plurality of holes whose axes are coaxial with an axis along the worm gear, and, wherein the worm gear operates to make direct contact with one of the plurality of reducer subassemblies, via the plurality of holes.

In another aspect, a method of driving a slew drive is disclosed wherein the slew drive comprises a housing, a worm wheel comprising worm-wheel teeth, wherein the worm wheel is rotatably secured within the housing and operative to rotate around a first axis, a worm gear comprising a first distal end, a second distal end, and a central segment disposed between the first distal end and the second distal end, wherein the central segment comprises a worm-gear thread, wherein the worm gear is rotatably secured within the housing and operative to rotate around a second axis, wherein the first distal end comprises a plurality of holes whose axes are coaxial with the second axis, and a reducer assembly comprising a plurality of reducer subassemblies, the method comprising directly connecting one of the plurality of reducer subassemblies with the worm gear, via the plurality of holes.

Preferably, the method further comprises rotating the reducer assembly around the second axis, via a motor.

In another aspect, a reducer assembly is disclosed wherein the reducer assembly comprises a plurality of reducer subassemblies, wherein one of the plurality of reducer subassemblies is in direct contact with a gear.

Preferably, the one of the plurality of reducer subassemblies comprises three planetary gears in direct contact with the gear.

Preferably the gear is a worm gear.

DETAILED DESCRIPTION OF THE PRESENTLY PREFERRED EMBODIMENTS

Figure 1:
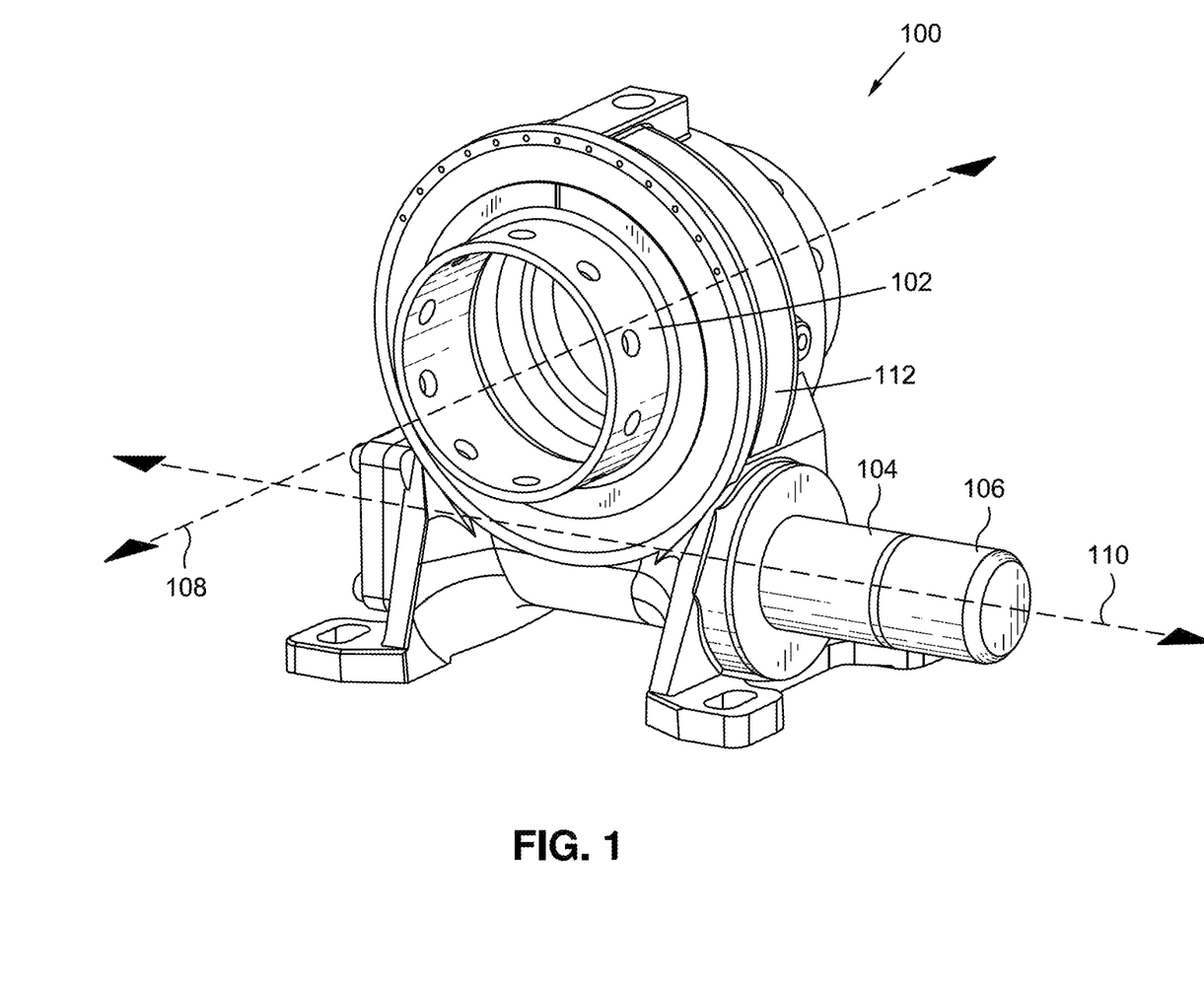
FIG. 1 shows a perspective view of a conventional slew drive comprising a worm gear/worm wheel assembly, a reducer assembly, and a motor utilized to drive the reducer assembly which, in turn, drives the worm gear/worm wheel assembly.

FIG. 1 depicts a perspective view of a conventional slew drive 100 comprising a worm gear/worm wheel assembly 102, a reducer assembly 104, and a motor 106 utilized to drive the reducer assembly 104 which, in turn, drives the worm gear/worm wheel assembly 102 secured with in a housing 112. The worm gear/worm wheel assembly 102 includes a worm gear (not shown) having a threaded central segment and rotating around an axial axis of the worm gear 110, which engages the teeth of the worm wheel (not shown) rotating the worm wheel around another axis 108 which is commonly perpendicular to the axial axis 110 of the worm gear. The axes 108 and 110 may be oriented at a different angle than 90 degrees depending on the application. The worm gear is driven by the reducer assembly 104 which includes a plurality of reducer subassemblies (shown in FIG. 2). The motor 106 which may be an electric motor or a hydraulic motor drives the reducer assembly 104. The motor 106 operates at a relatively high rotational speed and imparts a relatively low torque upon the reducer assembly 104. The reducer assembly 104 operates to reduce the rotational speed of the motor 106, via the plurality of reducer subassemblies, but increases the torque which it applies upon the worm gear. Finally, the worm gear's rotational speed and torque are reduced and increased, respectively, through the engagement of the worm gears thread and worm wheel teeth. FIGS. 2 through 5 depict in detail the components that are used in a conventional slew drive and the improvements upon which achieved by the present invention.

Figure 2:
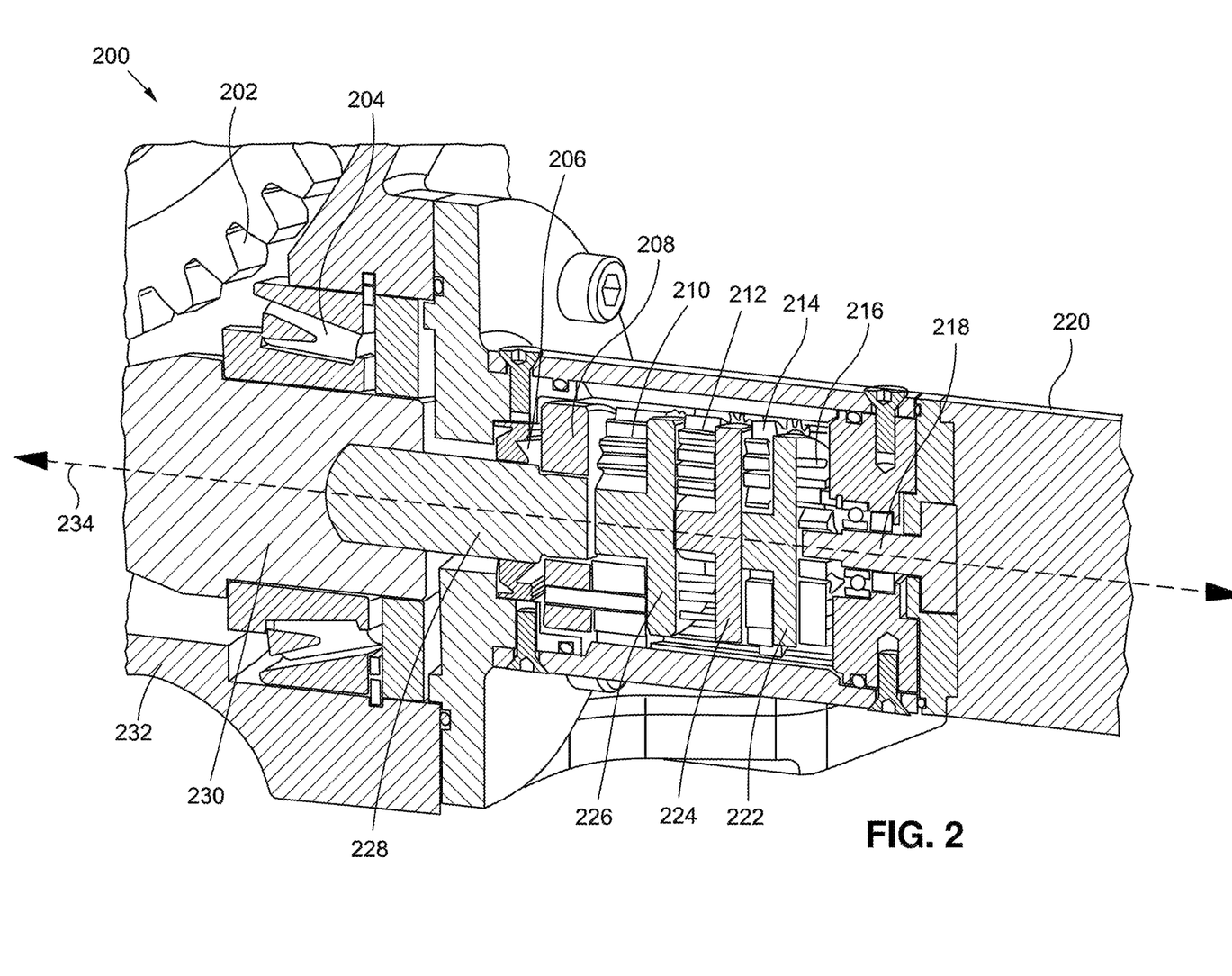
FIG. 2 shows a cutaway cross-sectional view of a conventional slew drive illustrating the components utilized to drive the system and, specifically, the last carrier, the splined shaft, and the seal.

FIG. 2 depicts a cutaway cross-sectional view of a conventional slew drive 200 illustrating the components utilized to drive it. A motor 220 operates to drive a reducer assembly (shown in detail in FIG. 4) around an axis 234 of a worm gear 230. Specifically, the motor 220, having a drive shaft 218, engages the reducer assembly having a series of planetary gear trains so that the output of the reducer assembly rotates at a rotational speed which is substantially lower than the rotational speed of the motor 220 while increasing the applied torque to the worm gear 230. The planetary gears 210, 212, 214, and 216, and the carriers 208, 226, 224, and 222 which include sun gears cooperate to achieve the speed reduction and torque increase. The last carrier 208 is coupled with the worm gear 230 via a splined shaft 228. A seal 206 maintains the lubricant within the reducer assembly. A tapered roller bearing 204 is utilized to secure the worm gear 230 to a housing 232 of the slew drive 200. The last carrier 208 has an internal female splined hole which engages the shaft 228. The splined shaft 228, in turn, engages the worm gear 230 via the worm gear's own internal female splined hole (shown in FIG. 4), thus, rotating the worm gear 230, whose rotation causes the worm wheel 202 to rotate around an axis perpendicular to the axis 234 of the worm gear 230.

Figure 3:
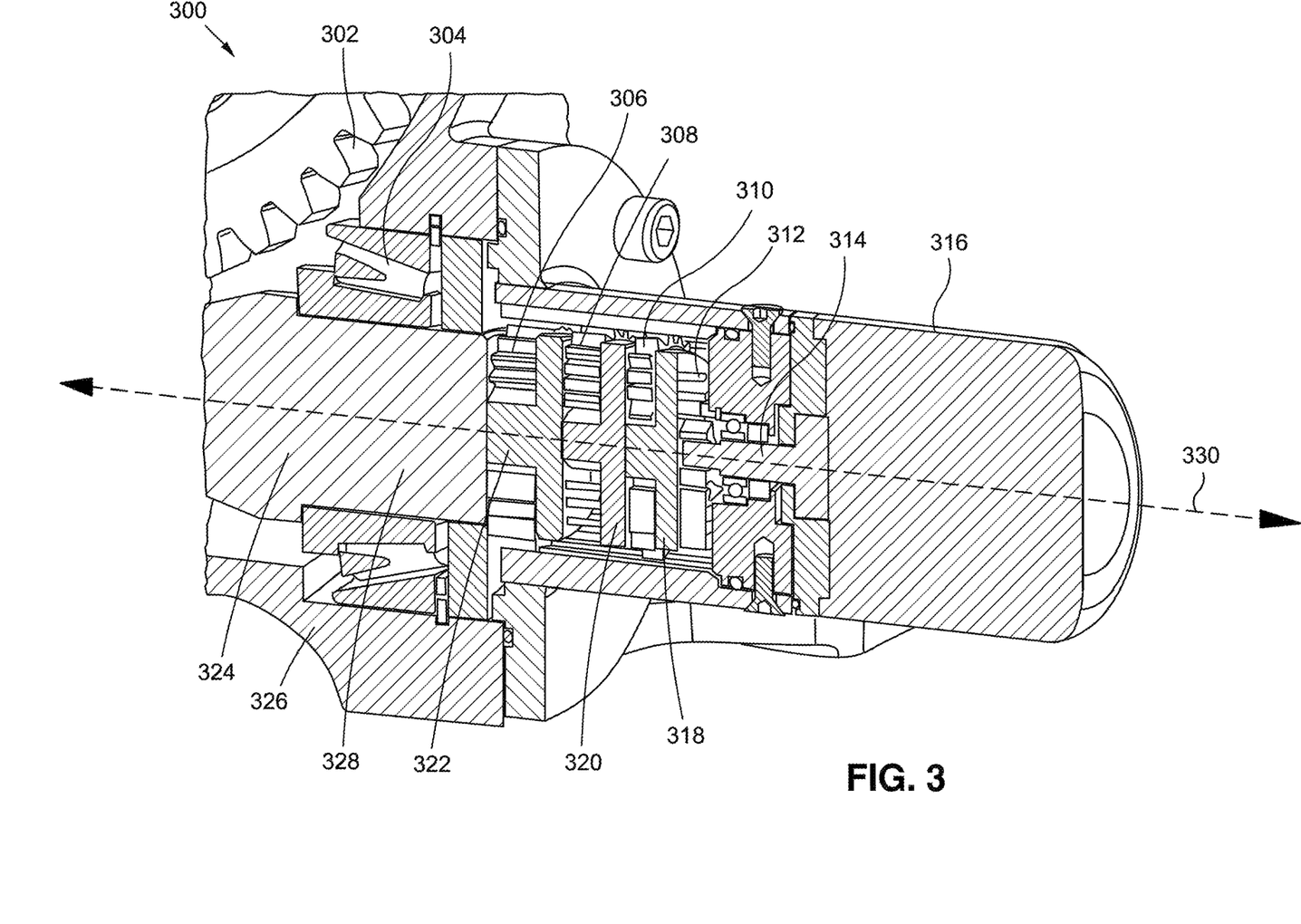
FIG. 3 shows a cutaway cross-sectional view of a preferred embodiment of a slew drive including a worm gear that is in direct contact with one of a plurality of reducer subassemblies illustrating the elimination of the last carrier, the splined shaft, and the seal in comparison with the conventional slew drive shown in FIG. 2.

FIG. 3 depicts a cutaway cross-sectional view of a preferred embodiment of a slew drive 300 including a worm gear 324 that is in direct contact with one of a plurality of reducer subassemblies, in this instance three planetary gears 306, illustrating the elimination of a carrier such as the last carrier 208, a splined shaft such as the splined shaft 228, and a seal such as the seal 206 in comparison with the conventional slew drive shown in FIG. 2. The worm gear 324 is rotatably secured to a housing 326 at both ends via bearings such tapered roller bearing 304. As can be seen, the worm gear 324 includes a first distal end 328 which operates as the last carrier 208 which engages the planetary gears 306 eliminating the shaft 228 and the seal 206 as shown in FIG. 2. The first distal end 328 of the worm gear 324 comprises a plurality of holes whose axes are coaxial with an axis 330 of the worm gear 324 (shown in more detail in FIG. 5) which engages the planetary gears 306 which are one of a plurality of reducer subassemblies of the reducer assembly. The remaining reducer subassemblies comprise components which include carriers 318, 320, and 322 which in this configuration include sun gears, and planetary gears 308, 310, and 312. The reducer assembly is rotated around the axis 330 via a motor 316 having a drive shaft 314. According to this configuration, the overall length of the worm gear/reducer assembly is also decreased.

Figure 4:
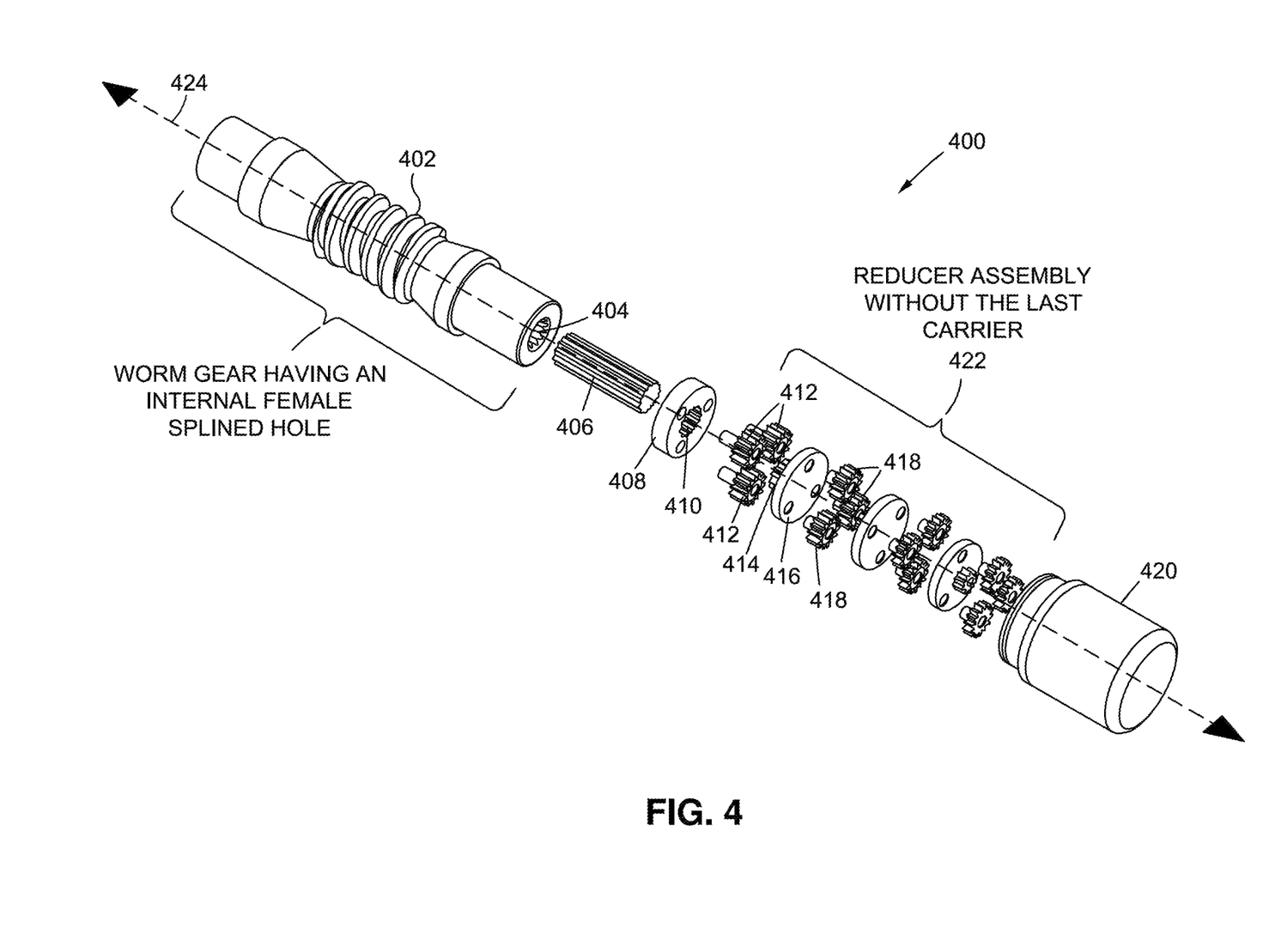
FIG. 4 shows an exploded view of a worm gear which is driven by a motor via a reducer assembly of a conventional slew drive such as the one shown in FIG. 2.

FIG. 4 depicts, an exploded view 400 of a worm gear 402 which is driven by a motor 420 via a reducer assembly 422 of a conventional slew drive such as the one shown in FIG.

2. The reducer assembly 422 comprises a plurality of reducer subassemblies. In this instance, each reducer subassembly comprises at least one of a carrier, such as carrier 416, a sun gear, such as sun gear 414, and three planetary gears, such as three planetary gears 418. The output speed of the reducer assembly 422 is substantially lower than its input speed, i.e., the speed of the motor 420, while its output torque which is applied to the worm gear 402 is substantially higher than its input torque, i.e., the torque of the motor 420. One such reducer subassembly includes three planetary gears 418, carrier 416, and sun gear 414. The last subassembly comprises three planetary gears 412 and a carrier 408. This last carrier 408 includes a central female splined hole 410. A splined shaft 406 engages the splined hole 410 of the carrier 408. The splined shaft 406 is coupled with the worm gear 402 via an internal female splined hole 404 in the worm gear 402. The carrier 408 rotates the shaft 406 which, in turn, rotates the worm gear 402 around an axis 424. The worm gear 402 engages the teeth of the worm wheel (not shown) which is used to rotate an external unit around an axis perpendicular to the axis 424 of the worm gear 402.

Figure 5:
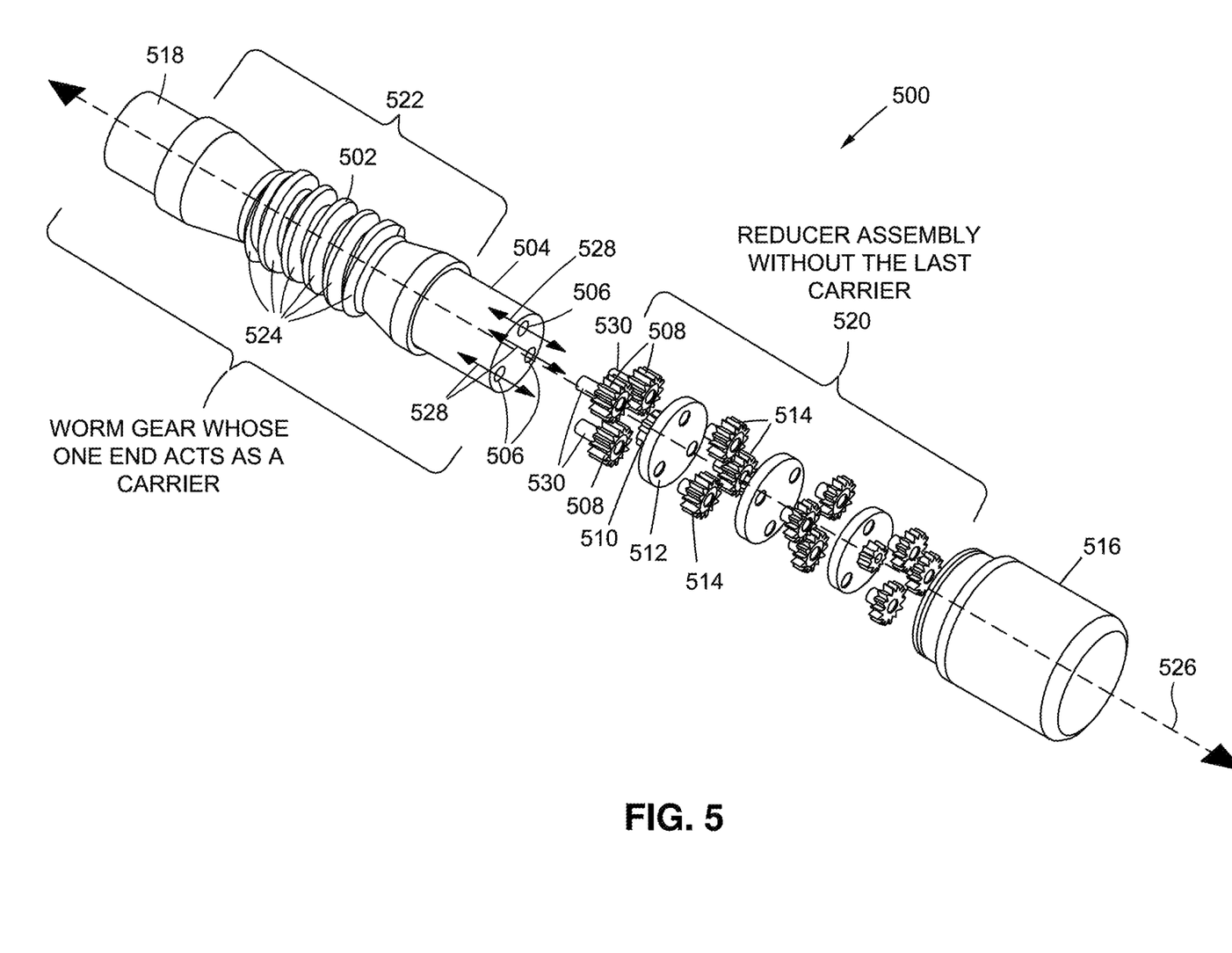
FIG. 5 shows an exploded view of a preferred embodiment of a worm gear which directly couples with three planetary gears of the reducer assembly of a slew drive such as the one shown in FIG. 3.

FIG. 5 shows an exploded view 500 of a preferred embodiment of a worm gear 502 which directly couples with three planetary gears 508 of a reducer assembly 520 of a slew drive such as the one shown in FIG. 3. In this instance, the worm gear 502 is a worm gear which comprises a first distal end 504, a second distal end 518, and a central segment 522 disposed between the first distal end 504 and the second distal end 518. The central segment 522 comprises a worm-gear thread 524. In one instance, the central segment 522 of the worm gear 502 comprises an hourglass profile.

The worm-gear thread 524 engages the teeth of a worm wheel, such as the worm wheel 302 shown in FIG. 3 and rotates the worm wheel around its axis of rotation which is at a different angle from the axis 526 of rotation of the worm gear 502. The worm gear 502 is rotatably secured within a housing, such as the housing 326 shown in FIG. 3, at both ends via bearings such as the tapered roller bearing 304 shown in FIG. 3.

The worm gear 502 rotates around its axial axis 526. The first distal end 504 of the worm gear 502 comprises a plurality of holes, in this instance three holes 506. The axes 528 of the three holes 506 are coaxial with the rotational axis 526 of the worm gear 502. The holes 506 have a circular cross section but other cross sections such as square or hexagonal are contemplated. In a preferred embodiment, the holes 506 are splined.

A reducer assembly 520 comprises a plurality of reducer subassemblies, one of which is in direct contact with the worm gear 502. In this preferred embodiment, the last reducer subassembly includes the three planetary gears 508 which include three shafts 530 which are inserted inside the three holes 506. In one instance, the planetary gear and its corresponding shaft are machined as a one-piece component. The subassemblies of the reducer assembly 520 include one or more of a carrier, a sun gear, and planetary gears. In this preferred embodiment, one of the subassemblies comprises three planetary gears 514, a carrier 512, and a sun, gear 510. Although in this preferred embodiment the reducer assembly 520 is in direct contact with a worm gear, in other preferred embodiments, the reducer assembly 520 may as well be in direct contact with a gear which is not a worm gear.

A motor 516 drives the reducer assembly 520 which, in turn, drives the worm gear 502. The motor 516 may be an electric motor, a hydraulic motor, or a pneumatic motor.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A slew drive, comprising:
   (a) a housing;
   (b) a worm wheel comprising worm-wheel teeth, wherein the worm wheel is rotatably secured within the housing and operative to rotate around a first axis;
   (c) a worm gear comprising a first distal end, a second distal end, and a central segment disposed between the first distal end and the second distal end, wherein the central segment comprises a won't-gear thread, wherein the worm gear is rotatably secured within the housing and operative to rotate around a second axis, wherein the first distal end comprises a plurality of holes whose axes are coaxial with the second axis; and
   (d) a reducer assembly comprising a plurality of reducer subassemblies, wherein one of the plurality of reducer subassemblies is in direct contact with the worm gear, via the plurality of holes.

2. The slew drive of claim 1, wherein each of the plurality of reducer subassemblies comprises at least one of a carrier, a sun gear, and three planetary gears.

3. The slew drive of claim 1, wherein the one of the plurality of reducer subassemblies comprises three planetary gears in direct contact with the worm gear, via three of the plurality of holes.

4. The slew drive of claim 1, wherein the first axis is perpendicular to the second axis.

5. The slew drive of claim 1, further comprising a motor coupled with the reducer assembly and operative to rotate the reducer assembly around the second axis.

6. The slew drive of claim 5, wherein the motor is one of a hydraulic motor, an electric motor, and a pneumatic motor.

7. The slew drive of claim 1, wherein a cross section of the plurality of holes comprise one of a circular cross section, a square cross section, and a hexagonal cross section.

8. The slew drive of claim 1, wherein the plurality of holes are splined.

9. A worm gear in combination with a slew drive, wherein the slew drive comprises a housing, a worm wheel, and a reducer assembly, wherein the worm wheel comprises worm-wheel teeth and wherein the reducer assembly comprises a plurality of reducer subassemblies, wherein the worm gear comprises:

a first distal end, a second distal end, and a central segment disposed between the first distal end and the second distal end, wherein the central segment comprises a worm-gear thread, wherein the first distal end comprises a plurality of holes whose axes are coaxial with an axis along the worm gear, and wherein the worm gear operates to make direct contact with one of the plurality of reducer subassemblies, via the plurality of holes.

10. A method of driving a slew drive, wherein the slew drive comprises:
   (a) a housing;
   (b) a worm wheel comprising worm-wheel teeth, wherein the worm wheel is rotatably secured, within the housing and operative to rotate around a first axis;

(c) a worm gear comprising a first distal end, a second distal end, and a central segment disposed between the first distal end and the second distal end, wherein the central segment comprises a worm-gear thread, wherein the worm gear is rotatably secured within the housing and operative to rotate around a second axis, wherein the first distal end comprises a plurality of holes whose axes are coaxial with the second axis; and (d) a reducer assembly comprising a plurality of reducer subassemblies;

the method comprising directly connecting one of the plurality of reducer subassemblies, with the worm gear, via the plurality of holes.

11. The method of claim 10, further comprising rotating the reducer assembly around the second axis, via a motor.

12. A reducer assembly comprising a plurality of reducer subassemblies, wherein one of the plurality of reducer subassemblies is in direct contact with a gear, wherein the gear comprises a first distal end and a second distal end, wherein the gear is rotatably secured, within a housing and operative to rotate around an axial axis, wherein the first distal end comprises a plurality of holes whose axes are coaxial with the axial axis of the gear, and wherein the one of the plurality of reducer assemblies is in direct contact with the gear via the plurality of holes.

13. The reducer assembly of claim 12, wherein the one of the plurality of reducer subassemblies comprises three planetary gears in direct contact with the gear.

14. The reducer assembly of claim 12, wherein the gear is a worm gear.

* * * * *